Nov. 29, 1927.　　　　　　　　　　　　　　　1,651,319
J. W. BOWMAN
MILL
Filed July 19, 1926　　　　2 Sheets-Sheet 1
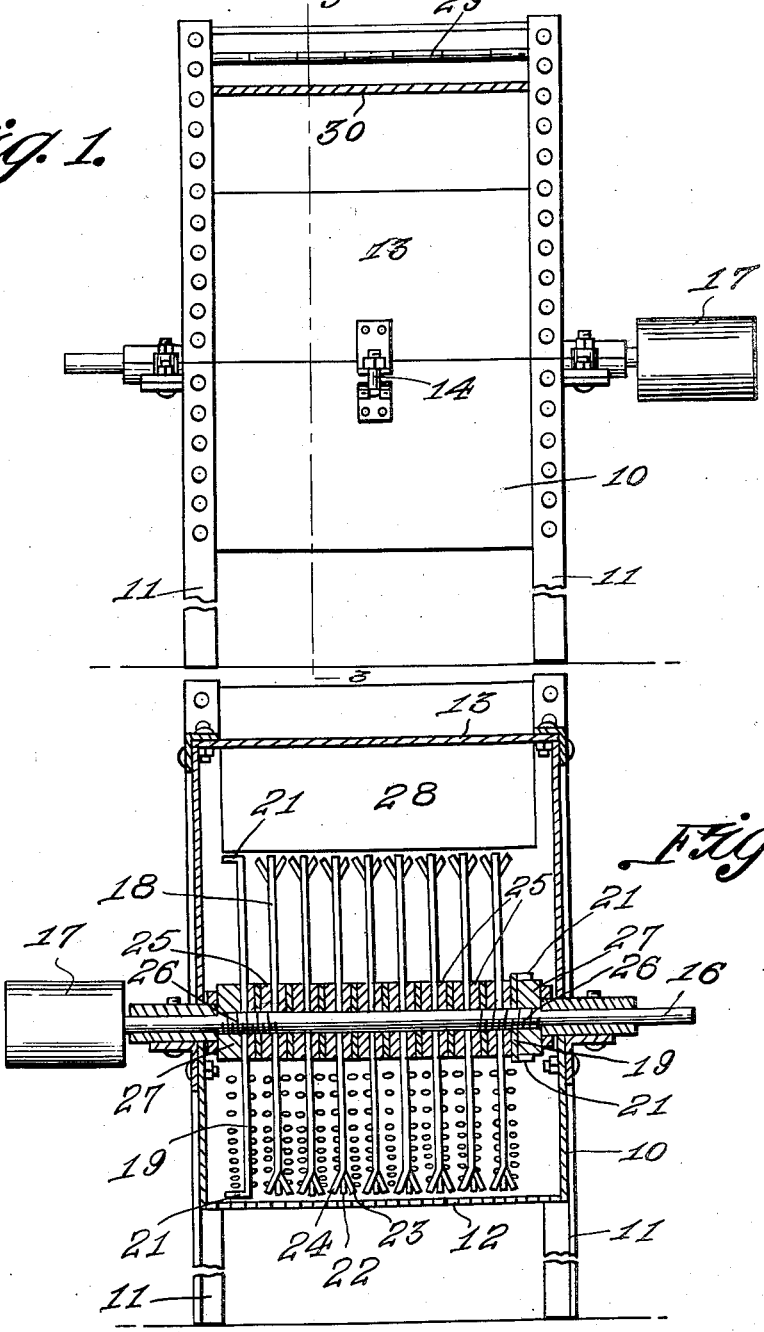

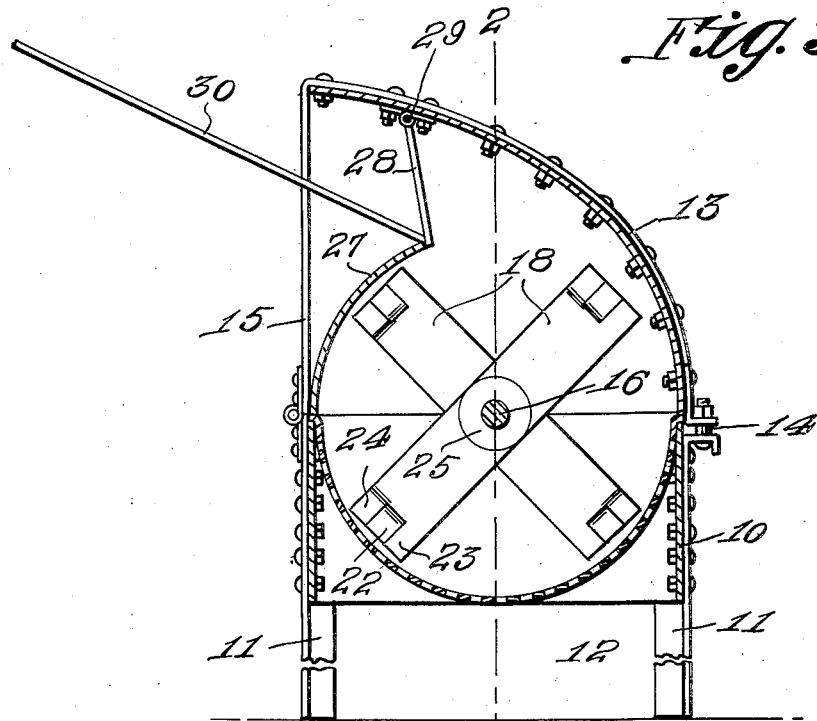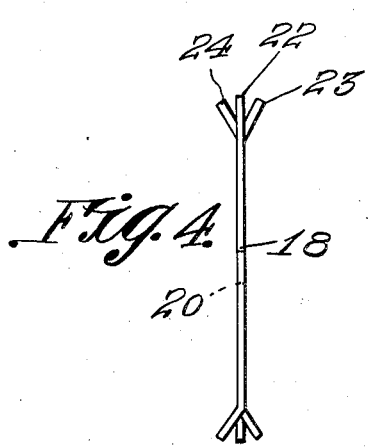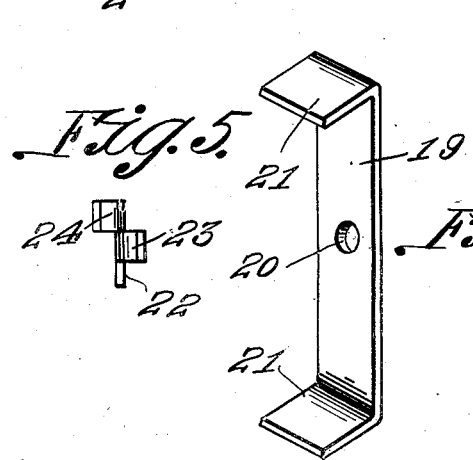

Patented Nov. 29, 1927.

1,651,319

UNITED STATES PATENT OFFICE.

JOHN W. BOWMAN, OF WARRENSBURG, MISSOURI.

MILL.

Application filed July 19, 1926. Serial No. 123,453.

This invention relates to improvements in grinding mills especially designed for grinding feed and has for an object the provision of a mill of the hammer type having hammer grinding arms of novel formation, arranged to provide a grinding cylinder whose grinding elements will be so positioned that an imaginary line parallel with the axis of the cylinder will be cut by said grinding elements throughout the length of the cylinder and all of the material within the mill will thus be acted upon.

Another object of the invention is the provision of a mill which in addition to the above and other advantages, is simple of construction and may be easily taken apart and reassembled for purposes of repair.

With the above and other objects in view, the invention further includes the following novel features and details of construction, to be hereinafter more fully described, illustrated in the accompanying drawings and pointed out in the appended claims.

In the drawings:—

Figure 1 is an elevation of a grinding mill constructed in accordance with the invention.

Figure 2 is a section taken substantially on the line 2—2 of Figure 3.

Figure 3 is a section on the line 3—3 of Figure 1.

Figure 4 is a detail edge view of one of the intermediate grinding hammers.

Figure 5 is an edge view of the hammer shown in Figure 4.

Figure 6 is a detail perspective view of one of the end hammers.

Referring to the drawings in detail wherein like characters of reference denote corresponding parts, the mill is shown as comprising a casing which includes a hopper or container 10 constructed of sheet metal with the side and end walls bolted together and supported upon legs 11. A substantially semi-cylindrical foraminous bottom 12 is provided for the container. A hood cover 13 is secured as shown at 14, and is likewise formed of sheet metal. and has one edge spaced above the top of the container by means of a support 15.

Mounted for rotation within the casing is a shaft 16 which is designed to be driven at high speed and for this purpose is provided with a pulley 17 which may be connected with a suitable source of power.

Mounted upon the shaft 16 is a grinding cylinder and the latter comprises radially extending arms 18 and 19. These arms are formed of flat metallic plates as shown in Figures 4, 5 and 6 of the drawings and are provided with openings 20 for the passage of the shaft 16. The arms 19 which are located at each end of the cylinder have their outer ends bent to provide outwardly extending substantially right angularly disposed grinding elements 21. The intermediate arms 18 have their outer ends slitted and the material between these slits arranged to provide grinding elements 22, 23 and 24. The grinding elements 22 are disposed in a line with the arms 18, while the elements 23 and 24 are reversely or oppositely offset so as to extend laterally in opposite directions from the arms.

The arms are separated by spacing washers 25 and the space between the arms is such that the offset grinding elements 23 and 24 will extend outward a sufficient distance to cut the entire length of an imaginary line parallel with the axis of the grinding cylinder, when the latter is rotated. Thus all of the feed or material within the casing will be acted upon during the rotation of the grinding cylinder. The shaft 16 is reversely threaded as shown at 26 and the arms are frictionally held thereon by means of lock nuts 27. As the arms are frictionally mounted they would give in the event of a metallic or hard substance being inadvertently put into the mill and thus materially reduce danger of damage to said mill.

The configuration of the cover 13 and the manner of supporting the same provides an entrance mouth for the receptacle. This mouth is provided at its lower edge with an inwardly curved lip 27 and is designed to be closed by a gate or valve 28. The gate or valve 28 is pivotally mounted as at 29 and is normally closed by gravity. A feed plate 30 is inclined downwardly toward the lower edge of the mouth so that the material may pass into the receptacle beneath the valve 28.

The invention is susceptible of various changes in its form, proportions and minor details of construction and the right is herein reserved to make such changes as properly fall within the scope of the appended claim.

Having described the invention what is claimed is:—

A mill comprising a housing, a shaft mounted for rotation therein, spaced radially extending arms secured upon said shaft, the outer ends of the arms having transversely spaced longitudinal slits therein at each end and the material between the slits offset to provide grinding element teeth, certain of the teeth being inclined oppositely and laterally and one tooth disposed in line with the arm and a foraminous bottom for the casing.

In testimony whereof I affix my signature.

JOHN W. BOWMAN.